United States Patent
Doraiswami et al.

(10) Patent No.: US 11,528,206 B2
(45) Date of Patent: Dec. 13, 2022

(54) IDENTIFYING AND MAPPING APPLICATIONS TO DEVICES IN A NETWORK

(71) Applicant: Ordr Inc., Sanata Clara, CA (US)

(72) Inventors: Vijayaraghavan Doraiswami, Santa Clara, CA (US); Vivekanandan Vinayagam, San Ramon, CA (US); Sheausong Yang, Saratoga, CA (US); Gnanaprakasam Pandian, Cupertino, CA (US); Krishna Kumar Vavilala, Bangalore (IN)

(73) Assignee: Ordr Inc., Santa Clara, CA (US)

( * ) Notice: Subject to any disclaimer, the term of this patent is extended or adjusted under 35 U.S.C. 154(b) by 0 days.

(21) Appl. No.: 17/194,566

(22) Filed: Mar. 8, 2021

(65) Prior Publication Data
US 2022/0272015 A1    Aug. 25, 2022

Related U.S. Application Data

(60) Provisional application No. 63/152,528, filed on Feb. 23, 2021.

(51) Int. Cl.
*H04L 43/087* (2022.01)
*H04L 43/0876* (2022.01)
*H04L 45/00* (2022.01)
*H04L 47/80* (2022.01)

(52) U.S. Cl.
CPC .......... *H04L 43/0876* (2013.01); *H04L 45/72* (2013.01); *H04L 47/803* (2013.01)

(58) Field of Classification Search
CPC .... H04L 43/0876; H04L 45/72; H04L 47/803
See application file for complete search history.

(56) References Cited

U.S. PATENT DOCUMENTS

2018/0287903 A1* 10/2018 Joshi ................... H04L 43/062
2021/0250192 A1* 8/2021 Alonso Franco ... H04L 12/1403

\* cited by examiner

*Primary Examiner* — June Sison
(74) *Attorney, Agent, or Firm* — Invoke

(57) ABSTRACT

Techniques for identifying and mapping applications to devices in a network are disclosed. A system monitors data transmitted on a network to identify a plurality of data traffic patterns in the network. Based on the plurality of data traffic patterns, the system identifies a plurality of applications associated with respective subsets of the data, the plurality of applications including a first and a second application. The system determines that a particular network infrastructure element, among the plurality of network infrastructure elements, processes data associated with the first application. The system stores a mapping between the particular network infrastructure element and the first application.

18 Claims, 6 Drawing Sheets

IDENTIFYING AND MAPPING APPLICATIONS TO DEVICES IN A NETWORK

This application is hereby incorporated by reference: U.S. Pat. No. 63/152,528 filed on Feb. 23, 2021. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to mapping applications to devices in a network. In particular, the present disclosure relates to monitoring a network to identify applications including data traversing network devices. A system analyzes network traffic and device configurations to determine which applications are processed by the network devices. The system maps the applications to the network devices.

BACKGROUND

In a typical network, many different applications may be running on many different servers accessed by many remote clients. Devices along a data transmission path between a client device executing an application and a server storing and processing data associated with the application do not know which user is requesting access to an application or which application is being accessed. For example, a router looks only at a source IP address and maps the source IP address to a private IP address. The router does not determine which client is requesting access or which application is being accessed. Similarly, a data packet may include a port number associated with an application of a server. However, a network device forwarding the data packet does not identify which application is associated with a particular port number. In addition, even if a network device were to perform deep packet inspection to identify the contents of a packet, the contents of the packet may be encrypted, preventing a network device from identifying a particular source device, a particular destination device, or a particular application associated with the packet. As a result, when a change is required in a network, a system may be unable to identify the applications and clients affected by the change.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
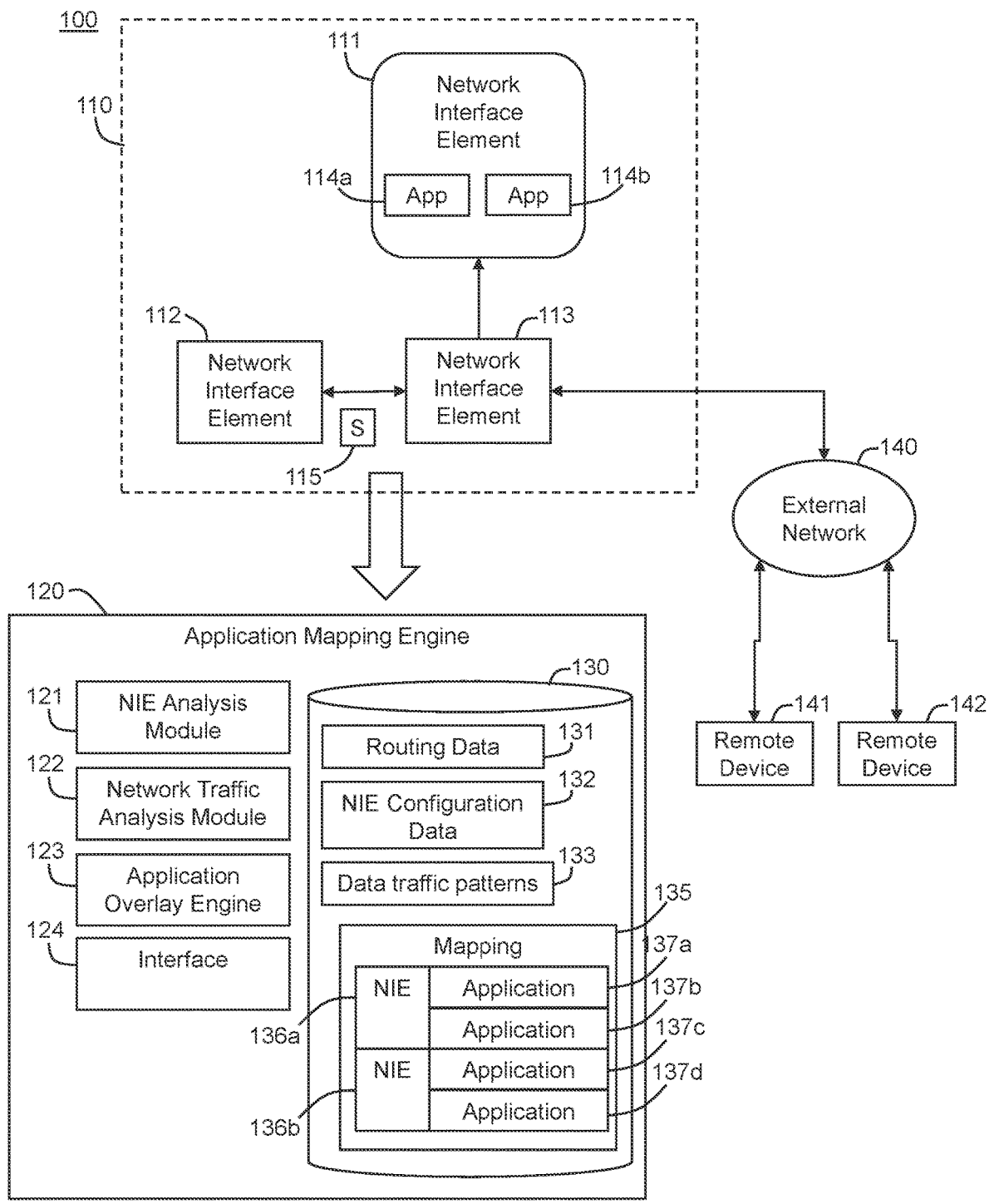
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. General Overview
2. System Architecture
3. Identifying and Mapping Applications to Network Devices
4. Example Embodiment
5. Computer Networks and Cloud Networks
6. Miscellaneous; Extensions
7. Hardware Overview

1. General Overview

One or more embodiments identify and map applications to network devices that support the applications. In an example, a network device may support an application by processing data (e.g., computing, editing, transmitting, or performing operations on the data) associated with the application. The mapping between applications and network devices may be used for a variety of different scenarios. As an example, an application (or an entity associated with the application) may be notified in advance of downtime for maintenance operations corresponding to a network device that processes data associated with the application. A network device may be configured based on the applications supported by the network device. An application may be configured based on the network devices that support the application. In an example, data management measures for the network device may be implemented based on the requirements or recommendations corresponding to the application(s) for which the network device is processing data. The data management measures may be modified at runtime based on the set of applications currently supported by the network device. An application may also be configured to handle different types of data based on the characteristics of the network device(s) that support the application.

One or more embodiments identify data patterns associated with applications running on the network. For example, remote devices may access a server in a data center to execute an application hosted on the server. The data associated with the application and transmitted via the network has a pattern that is specific to the type of application. For example, voice-type applications may generate data having one type of pattern. Email-type applications may generate data having another type of pattern. The system identifies an application associated with a particular pattern. The system also identifies network devices that service data associated with the application. For example, the system identifies each switch along a transmission path between a router and a server hosting the application. The system maps the applications to the network devices that service the applications.

In one or more embodiments, the system does not have access to an application name or application type when the system identifies the applications associated with the data traffic patterns. For example, a packet may be encrypted or the application type may not be immediately identifiable based only on the data in the packet. The system may map applications to network devices by accessing application configuration information in a server, configuration information in network devices along the transmission path of the application data in the network, and the pattern associated with the application data in the network.

In one or more embodiments, the system receives a request associated with a particular network device. The system transmits a notification to a user or client having an application serviced by the device. For example, a request may include a request to interrupt service on the network device or update the network device. The system analyzes the mapping of applications serviced by the device to identify the users or clients associated with the applications.

In one or more embodiments, the applications include proprietary applications for a particular entity. The system may not have access to information regarding a name of the application. Instead, the user may identify the application based on its data traffic pattern. For example, the system may be able to distinguish between an email application, a voice application, and a video application based on differences in the patterns associated with the respective applications. The system may transmit a notification to an entity that service associated with a video application executed by a remote device associated with the entity may be interrupted. The system may then obtain feedback regarding whether the interruption is acceptable or whether to reschedule or halt the interruption. For example, a user may decide whether to perform, reschedule, or halt an the interruption.

In one or more embodiments, the system generates, for a particular entity, an overlay to display the network devices servicing applications associated with the entity. The overlay may identify for the user potential changes in the network to meet the needs of the entity.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes network infrastructure elements 111, 112, and 113 and an application mapping engine 120. The network infrastructure elements 111, 112, and 113 service data for applications 114a and 114b. Examples of servicing data include receiving and transmitting data packets, processing data contained in data packets, storing data obtained from data packets, generating data contained in data packets, routing data packets, and forwarding data packets. In one or more embodiments, the network infrastructure element 111 is a server that hosts applications 114a and 114b. The remote devices 141 and 142 access the applications 114a and 114b in the server to execute the applications locally in the remote devices 141 and 142.

In one or more embodiments, network infrastructure element 113 is a gateway—such as a switch or router—that transmits data through a private network 110. While only one network infrastructure element 113 directly between the remote devices 141/142 and the network infrastructure element 111 is illustrated in FIG. 1, embodiments encompass any number of network infrastructure elements 113 along data transmission path between remote devices 141/142 and the network infrastructure element 111. In one or more embodiments, the network infrastructure element 113 is a gateway between the private network 110 and an external network 140. Remote devices 141 and 142 access the applications 114a and 114b hosted by the network infrastructure element 111 via the external network 140. In one or more embodiments, the remote devices 141 and 142 are associated with different tenants. In one or more embodiments, a tenant is a corporation, organization, enterprise or other entity that accesses a shared computing resource, such as applications 114a and 114b. In an embodiment, tenants associated with the remote devices 141 and 142 are independent from each other.

An application mapping engine 120 analyzes data traffic and configuration information of devices in the private network 110 to map applications to network infrastructure elements 111, 112, and 113. In one or more embodiments, a sensor 115 is positioned between two network infrastructure elements in the private network 110 to monitor data traffic between the network infrastructure elements.

The application mapping engine 120 includes a network infrastructure element (NIE) analysis module 121. The NIE analysis module 121 analyzes configuration data and tables stored in the network infrastructure elements 111, 112, and 113 to identify characteristics of data transmitted to, from, and through the network infrastructure elements 111, 112, and 113. The application mapping engine 120 includes a data repository 130 for storing data associated with the private network 110. In one or more embodiments, the NIE analysis module 121 obtains routing data 131 associating an address of a data packet received by a network infrastructure element with a destination assigned by the network infrastructure element to the data packet. For example, the routing data 131 may include data obtained from a routing table of a router associating an external Internet protocol (IP) address with a private IP address. Similarly, the routing data 131 may include server pool information associating a particular private IP address with a particular server pool or virtual server.

The NIE analysis module 121 also analyses configuration data from the network infrastructure elements 111, 112, and 113 to store NIE configuration data 132. Configuration data 132 includes a mapping of a server pool or server farm to a particular virtual server and applications mapped to a particular port number of a server.

The application mapping engine 120 includes a network traffic analysis module 122 which analyzes network traffic in the private network 110 do identify data traffic patterns 133. Examples of different types of data traffic patterns include data entry application patterns, graphics-based application patterns, email patterns, voice patterns, and video patterns.

The application mapping engine 120 stores a mapping 135 between applications and network infrastructure elements. For example, the mapping 135 identifies a first network infrastructure element 136a and an identifier of each application 137a and 137b serviced by the network infrastructure element 136a. Similarly, the mapping 135 identifies a second network infrastructure element 136b and an identifier of each application 137c and 137d serviced by the network infrastructure element 136b. In one or more embodiments, the application mapping engine 120 stores a mapping for each network infrastructure element in a private network.

An application overlay engine 123 uses the mapping 135 to generate an overlay displaying data traffic of applications in the private network 110. For example, the selection of a particular application may result in the application overlay engine 123 displaying the data flow of the application through the private network 110, including the network infrastructure elements that service the application. As another example, the selection of a particular entity may result in the application overlay engine 123 displaying the data flow of each application executed by remote devices associated with the particular user or client, including the network infrastructure elements that service the applications. In one or more embodiments, the application overlay engine 123 uses the overlay information of applications processed by each network infrastructure element 111, 112, and 113 to generate or recommend a data management policy for the network infrastructure elements 111, 112, and 113.

In one or more embodiments, interface 124 refers to hardware and/or software configured to facilitate communications between a user and the application mapping engine 120. Interface 124 renders user infrastructure elements and receives input via user infrastructure elements. Examples of interfaces include a graphical user interface (GUI), a command line interface (CLI), a haptic interface, and a voice command interface. Examples of user infrastructure elements include checkboxes, radio buttons, dropdown lists, list boxes, buttons, toggles, text fields, date and time selectors, command lines, sliders, pages, and forms.

In an embodiment, different components of interface 124 are specified in different languages. The behavior of user infrastructure elements is specified in a dynamic programming language, such as JavaScript. The content of user infrastructure elements is specified in a markup language, such as hypertext markup language (HTML) or XML User Interface Language (XUL). The layout of user infrastructure elements is specified in a style sheet language, such as Cascading Style Sheets (CSS). Alternatively, interface 124 is specified in one or more other languages, such as Java, C, or C++.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the application mapping engine 120. Alternatively, or additionally, a data repository 130 may be implemented or executed on a computing system separate from the application mapping engine 120. A data repository 104 may be communicatively coupled to the application mapping engine 120 via a direct connection or via a network.

Information describing the mapping 135 may be implemented across any of components within the system 100. However, this information is illustrated within the data repository 130 for purposes of clarity and explanation.

In one or more embodiments, an application mapping engine 120 refers to hardware and/or software configured to perform operations described herein for identifying applications running on a private network and mapping the applications to network infrastructure elements of the private network. Examples of operations for mapping applications to network infrastructure elements of a network are described below with reference to FIG. 2.

In an embodiment, the application mapping engine is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. Identifying and Mapping Applications to Network Devices

Figure 2:
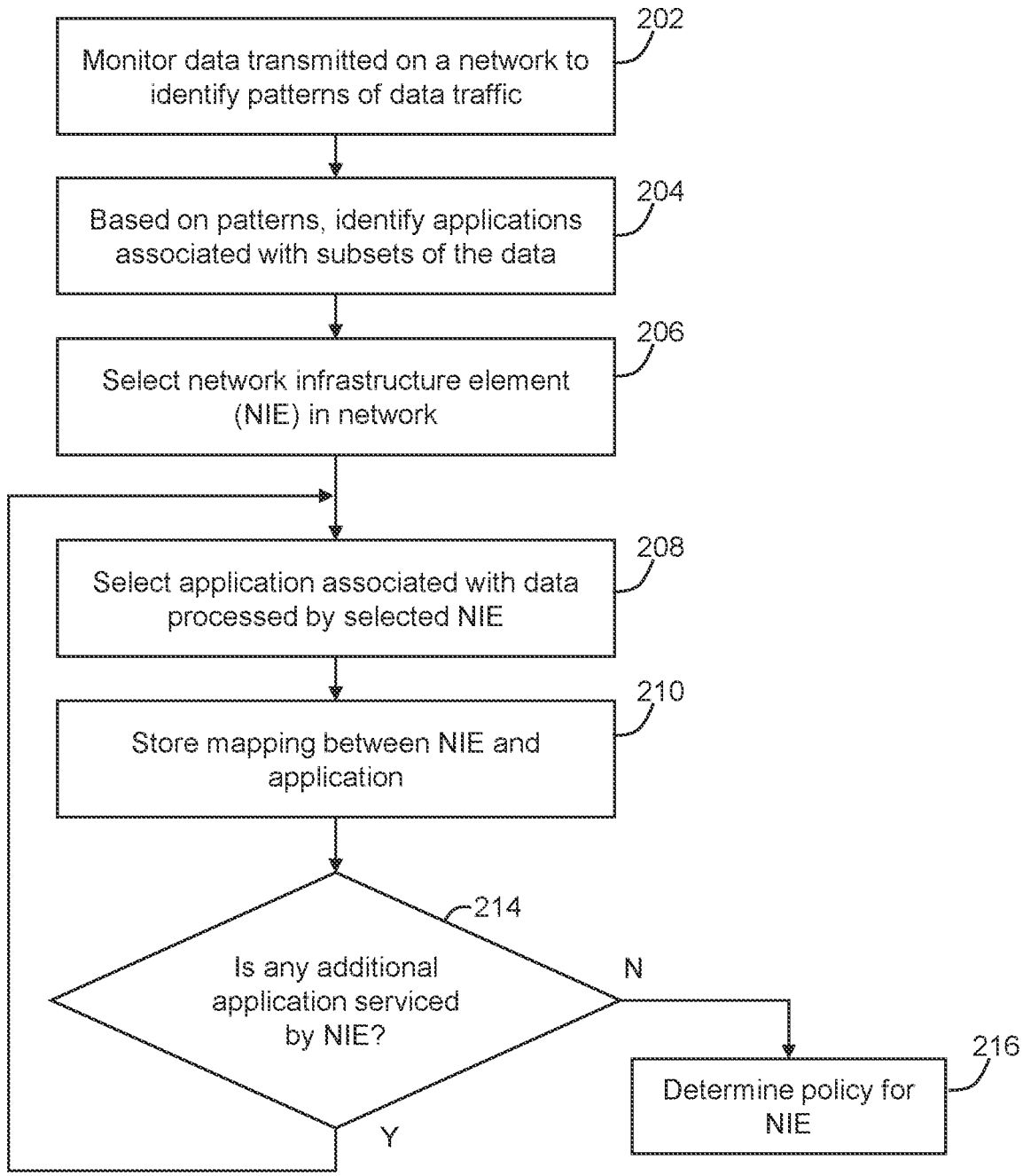
FIG. 2 illustrates an example set of operations for identifying applications in a network and mapping the applications to network devices in accordance with one or more embodiments.

FIG. 2 illustrates an example set of operations for identifying and mapping applications to network devices in a private network in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A private network is made up of a plurality of network infrastructure elements, such as routers, switches, load balancers, firewalls, servers, and databases. Applications stored in one network infrastructure element, such as in a server in a data center, may be accessed by other devices, whether in the private network or connected to the private network via a public network, such as the Internet.

In one or more embodiments, a system monitors data transmitted through the private network to identify patterns of data traffic (Operation 202). In one or more embodiments, the system monitors the data transmitted on the network using a sensor or monitoring device inserted between two nodes or gateways of the network. In one or more embodiments, the system monitors the data transmitted on the network by using an application of function of a particular node to identify patterns of data processed by the node. For example, the system may identify a first pattern as including a short data exchange followed by a long and bandwidth-intensive data exchange. The system may identify a second pattern as including only a one-way data transmission of a consistent data size. The system may identify a third traffic pattern as an exchange of data having a particular data priority level indicated in the data packets. The system may identify a fifth traffic pattern as having varying data sizes directed to a same data port of a server. The system may identify a sixth data traffic pattern as having particular transmission characteristics at a certain time of day.

Based on the data traffic patterns, the system identifies applications associated with the data traffic patterns (Operation 204). For example, the system may identify a particular data traffic pattern of an unknown application associated with a particular port of a server. The system may identify the data traffic pattern as being a voice-type data traffic pattern and may identify the unknown application as a voice-type application. In another example, the system may identify a data traffic pattern having a short data exchange followed by a long and bandwidth-intensive data exchange as a video-type application. The system may identify a pattern having a one-way data transmission of a consistent data size as a messaging application. The system may identify other data patterns as corresponding to email, voice, data management applications, or any other class of application.

In one or more embodiments, the system associates the data traffic patterns with applications without obtaining an application name or independent identifier of an application type. In one or more alternative embodiments, the system performs a deep packet scan to obtain additional information about the application. For example, a packet may include information classifying data contained in the packet as voice or video data. The system may associate the pattern associated with the packet with a voice or video application. In addition, or in the alternative, the system may access configuration information of a network infrastructure element to obtain specific information about an application associated with a data traffic pattern. For example, the system may identify a particular server port as being associated with data having a particular data traffic pattern. The system may access the server to identify the application associated with the particular port. The system may identify the application based on the combination of the data traffic pattern and the application information contained in the server.

The system selects a particular network infrastructure element, among the network infrastructure elements in the network, to perform mapping (Operation 206). In one or more embodiments, the system generates a network overlay by selecting each network infrastructure element in the system for mapping one at a time.

The system selects an application associated with data processed by the selected network infrastructure element (Operation 208). For example, the system may determine, when monitoring the data transmitted on the network, that six servers in a server pool are serviced by a particular switch. The system may select the switch for mapping. The system may then identify each application associated with the six servers that has data processed by the switch.

The system stores a mapping between the selected network infrastructure element and the selected application (Operation 210). In one embodiment, the mapping is stored as a table. The table identifies a network infrastructure element and each application serviced by the network infrastructure element. In the example of the switch servicing six servers, the table identifies the switch and each application of the six servers that transmits data through the switch. In one or more embodiments, the table includes additional information, such as a client or user associated with the application. In one or more embodiments, when the system monitors the data transmitted on the network, the system identifies the client or user associated with a particular application. For example, the system may identify an Internet protocol (IP) address or domain name to which traffic from the application is directed. In addition, or in the alternative, the system may identify client or user identification information in a server that hosts the application.

In one or more embodiments, the system stores the mapping remotely from the network infrastructure element being mapped. For example, a system administrator may maintain a data repository mapping every network infrastructure element of a local system maintained by the system administrator.

Upon mapping a particular application with a particular network infrastructure element, the system determines whether any other applications are associated with the particular network infrastructure element (Operation 214). For example, the system may identify ten applications that are processed by the network infrastructure element. The system may store a mapping associating the network infrastructure element with each of the ten applications.

Based on determining that each application serviced by a network infrastructure element has been mapped to the network infrastructure element, the system determines a policy to apply to the network infrastructure element (Operation 216). In one or more embodiments, the system configures the network infrastructure to support or not support particular applications based on the applications supported by the network infrastructure element. In addition, or in the alternative, the system may configure the network infrastructure element to perform particular operations at a particular time, based on the applications supported by the network infrastructure element.

In one or more embodiments, the system recommends or implements a data management policy associated with a network infrastructure element based on the applications supported by the application infrastructure element. In an example, the system implements data management measures for the network infrastructure element based on the requirements or recommendations corresponding to the application (s) for which the network infrastructure element is processing data. As another example, the system may assign a high security level to a network infrastructure element based on a high number of applications serviced by the network infrastructure element. In addition, or in the alternative, the system may assign a high security level to a network infrastructure element based on a priority level of the applications serviced by the network infrastructure element. The system may limit access to the network infrastructure element based on the security level, or the system may apply additional security features, such as running data traffic through an additional firewall, based on the security level. As another example, the system may configure a network infrastructure element to not support an unknown application based on determining that the network infrastructure element supports applications having a high priority or high security level. The data management measures may be modified at runtime based on the set of applications currently supported by the network infrastructure element.

In addition, or in the alternative, the system may configure an application based on the network infrastructure elements that support the application. For example, an application may also be configured to handle different types of data based on the characteristics of the network infrastructure element(s) that support the application.

Figure 3:
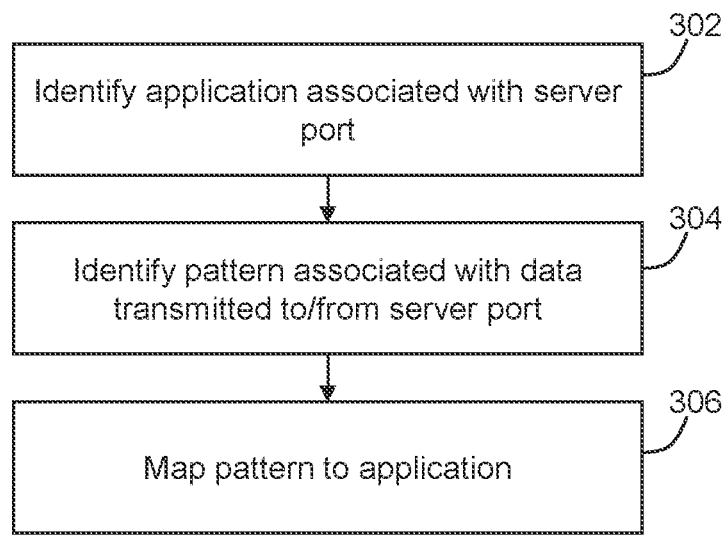
FIG. 3 illustrates an example set of operations for identifying patterns in a network and mapping the patterns to applications.

FIG. 3 illustrates an example set of operations for mapping a pattern of data traffic to a particular application according to one or more embodiments.

The system identifies an application associated with a server port (Operation 302). In one or more embodiments, particular ports are assigned to particular applications. For example, according to TCP/UDP (transmission control protocol/user datagram protocol) protocols, port 41 is assigned to graphics applications, port 57 is assigned to mail applications, and port 80 is assigned to web page applications. The system may identify an application based on protocol standards.

In addition, or in the alternative, the system may identify an application associated with a particular port based on configuration information of the server. For example, a port may not have a protocol-defined usage. In addition, an application may be a proprietary application created and used only within a particular organization or enterprise. The system may access the configuration information in the server hosting the application to obtain identification information for the application. In one or more embodiments, the application identification information may not contain details regarding the type or class of application. For example, an application name may be a proprietary name, such as "HRApp1." The name may not indicate whether the application is for voice, messaging, video, data maintenance, etc.

The system identifies a pattern associated with the data transmitted to and/or from the server port (Operation 304). The system may have previously identified particular data patterns as being associated with voice-type data traffic, video-type data traffic, webpage-type data traffic, or any other type of data traffic. The system identifies data associated with the particular patterns that accesses the particular server port.

Based on associating an application with a server port number and a data traffic pattern with the same port number, the system maps the pattern to the application (Operation 306). For example, if the system identifies the application associated with a particular data port as "HRApp1," and the system identifies a data traffic pattern associated with the port as corresponding to an application generating data queries to retrieve data from a database, the system maps the application to "HRApp1" to the pattern "database query/data retrieval."

Figure 4:
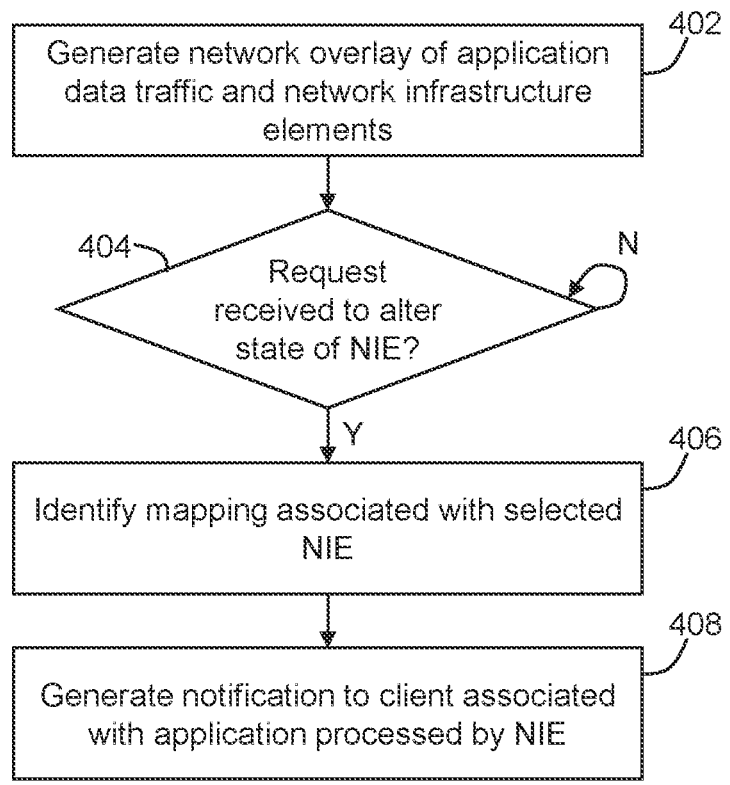
FIG. 4 illustrates an example set of operations for generating a network overlay of applications running on the network.

FIG. 4 illustrates an example set of operations for notifying an entity of a change in a network infrastructure element according to one or more embodiments.

A system generates a network overlay of application data traffic and network infrastructure elements (Operation 402). For example, the system may identify, for each network infrastructure element, which applications are serviced or processed by the network infrastructure element. In one or more embodiments, the system generates a diagram of the network infrastructure elements in a private network. The system may then generate an image depicting the data flow of data associated with each application processed by the private network.

The system receives a request to alter a state of a network infrastructure element (Operation 404). The request may by generated, for example, by a system administrator to determine which applications running in the system would be affected by replacing, backing up, updating, other otherwise altering the network infrastructure element.

The system identifies, for the device that is the object of the request, the mapping of applications to the device (Operation 406). In one or more embodiments, the mapping was previously generated and stored by the system. In addition, or in the alternative, the mapping may be generated upon receiving the request to alter the network infrastructure element.

The system generates a notification to an entity associated with the application serviced by the selected network infrastructure element (Operation 408). In one embodiment, the system identifies an entity associated with an application by analyzing the data traffic in the private network. In addition, or in the alternative, the system may access a server hosting the application to obtain the entity information. In addition, or in the alternative, the system may send a notification to one or more remote devices that execute the application without having identity information for the entity. In addition, or in the alternative, the system may send a notification to a system administrator. In one or more embodiments, the notification may include information about the applications serviced by the selected network infrastructure element to allow the system to perform the requested alteration at a time that would minimally affect the performance of applications serviced by the network infrastructure element.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
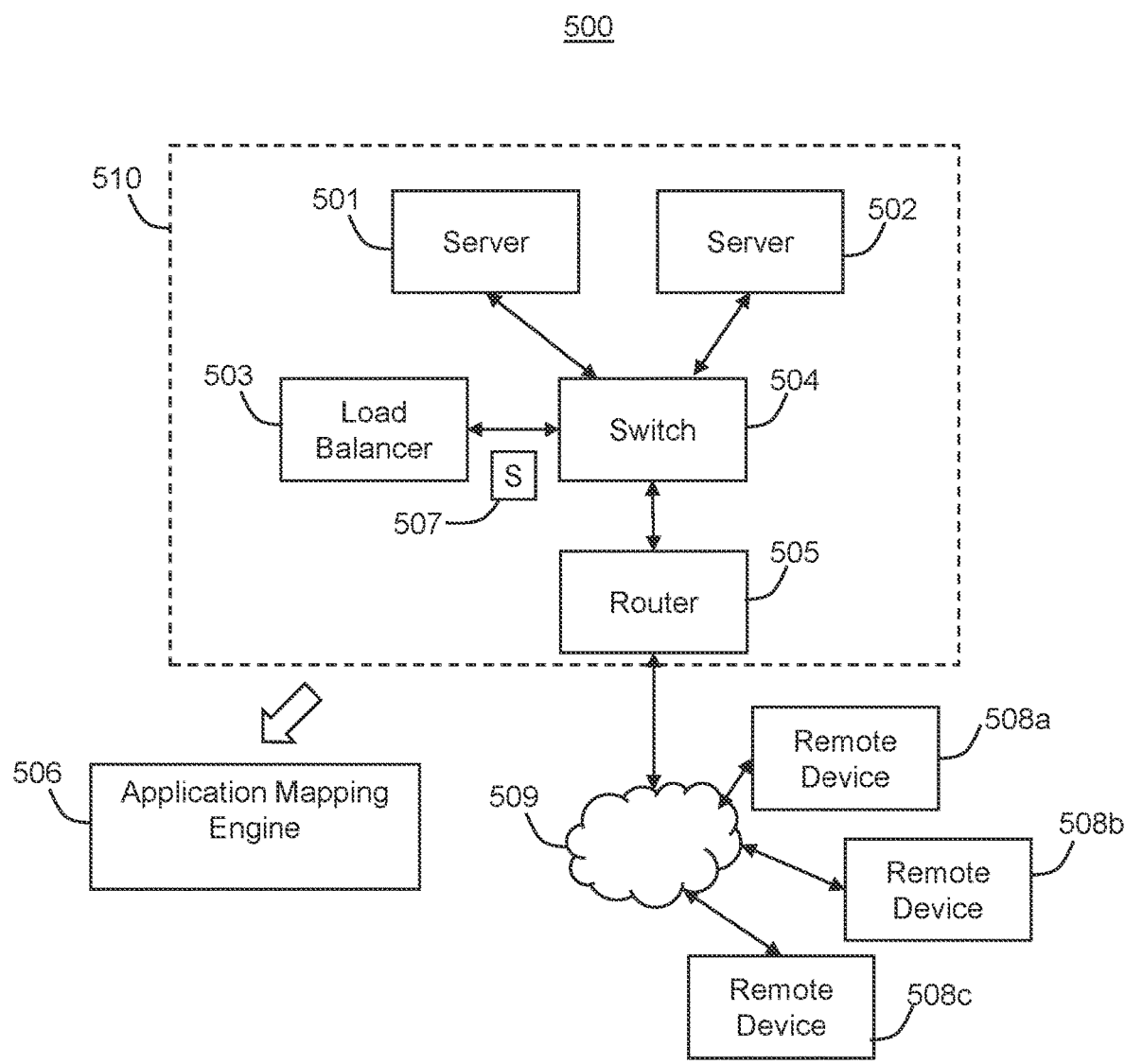
FIG. 5 illustrates an example embodiment of identifying and mapping applications on network devices in a network.

FIG. 5 illustrates a system 500 according to an example embodiment. The system 500 includes a private network 510 including servers 501, 502, a load balancer 503, a switch 504, and router 505. The private network 510 is connected to a public network 509. Remote devices 508a, 508b, and 508c access the servers 501, 502 via the public network 509.

In operation, data is transmitted from a remote device 508a directed to a server 501. The data is addressed with a domain name. The domain name is translated into a public IP address by a domain name system (DNS) server. The data is transmitted from the DNS server to the private network 510. The router 505 receives the data and routes the data to a private IP address associated with an application hosted by a server 501. The switch 504 directs the data to the load balancer 503. The load balancer 503 identifies a virtual server and server pool associated with the private IP address. The load balancer 503 sends the data back to the switch 504. The switch 504 transmits the data to the appropriate virtual server. A pool manager directs the data to the server 501. The server directs the data to the appropriate application based on a port number associated with the data.

Within the private network 510, none of the load balancer 503, switch 504, or router 505 identifies or stores information regarding a name or a type of application, or an entity associated with the application, associated with data that is being processed by the load balancer 503, the switch 504, or the router 505. Instead, the load balancer 504, the switch 504, and the router 505 refer to address information in a packet, stored tables, and stored configuration information, to process and forward data packets.

An application mapping engine 506 monitors data traffic in the private network 510 and maps applications serviced by devices in the network to the respective devices. A sensor 507 monitors data traffic between the switch 504 and the load balancer 503 to identify data traffic patterns.

The application mapping engine 506 analyzes data traffic in the private network 510 to identify data traffic patterns. For example, the application mapping engine 506 may identify a particular pattern of data transmitted between the server 501 and the router 505 as corresponding to a "voice" type application. The application mapping engine associates the particular patterns with particular types of applications based on data traffic patterns. The application mapping engine 506 may also associate the patterns with the types of applications based on configuration data from devices in the private network 510 and data contained in data packets, in combination with the data traffic patterns.

The router 505 receives data addressed to a public IP address and assigns the data to a private IP address to send the data to the appropriate server 501, 502. In one or more embodiments, the application mapping engine 506 may retrieve the domain name information and IP address information from the data to maintain a DNS cache. For example, the application mapping engine may store, for each IP address associated with an application in the private network 510 a corresponding one or more domain names. By storing a domain name associated with an application, the application mapping engine 506 may identify an entity that uses a particular application in the private network 510.

The application mapping engine 506 may further store the routing information associating the public IP address with the private IP address. For example, the application mapping engine 506 may store data indicating that a public IP address is associated with a private IP address "10.5.4.3."

The data is transmitted through the switch 504 to the load balancer 503. The data is then transmitted from the load balancer 503 through the switch 504 to a respective server 501, 502. The data transmitted between the switch 504 and the load balancer 503 may include address information indicating that the private IP address 10.5.4.3 is accessing a service "10.20.5.20:8001." The application mapping engine 506 accesses configuration information in the load balancer 506 to identify the application being accessed and the server in which the application is hosted.

In the example illustrated in FIG. 5, the servers 501 and 502 belong to different server pools. The server pools correspond to different virtual servers. The load balancer contains information associating particular application addresses with particular server pools. For example, the load balancer configuration information may include the following information regarding server pools:

```
"pool service1_8001 {
desc research_appl_server_pool
server 10.20.5.20:8001
server 10.20.5.21:8001
server 10.20.5.22:8001
}
pool_service1_8002 {
desc research_appl_server_pool
server 10.20.5.20:8001
server 10.20.5.21:8001
server 10.20.6.22:8001
server 10.20.7.22:8001
}
```

The load balancer 503 also contains virtual server information. For example, the load balancer may store the following configuration information:

```
virtual_server VS1 {
ip 10.139.25.30
tcp 8001
pool_name pool_service_8001
}
```

```
virtual_server VS1 {
ip 10.139.25.30
tcp 8002
pool_name pool_service_8002
}
```

By accessing the routing table of the router 505, and the virtual server information stored by the load balancer 503, the application mapping engine 506 is able to map a public IP address to a particular application hosted by a particular server 501, 502. In addition, by maintaining a DNS cache including the domain names associated with the public IP addresses, the application mapping engine 506 may further associate particular domains with particular applications.

Using the information obtained from the servers 501, 502, load balancer 503, switch 504, router 505, and sensor 507, the application mapping engine 506 maps applications running on the servers 501, 502 to each respective device in the private network 510.

For example, in an embodiment in which the private network 510 includes two switches 504 servicing different sets of servers, the application mapping engine 506 would map the applications processed by each respective switch. In one or more embodiments, a private network 510 may have multiple switches 504 associated with a respective multiple load balancers 503. Each load balancer may manage multiple virtual servers and server pools. The application mapping engine 506 identifies applications serviced by the particular switches 504, load balancers 503, virtual servers, and servers 501, 502.

Based on the mapping of the applications to the devices in the private network 510, the application mapping engine 506 identifies an action to be performed for a particular device.

For example, if the system receives a request to update a switch 504, the application mapping engine 506 refers to the application mapping to the switch 504 to identify any critical applications that may be affected by a service outage during the update. The application mapping engine 506 may generate a notification for an administrator, entity, or organization associated with an application regarding the outage. In one or more embodiments, the application mapping engine 506 may provide an alternative—such as changing a time for an update to the switch 504—to avoid adversely affecting performance of an application. As one example, a hospital may run an application used during operations to generate images of a surgical site in a patient. The application mapping engine 506 may identify the application as being a critical application that cannot be interrupted, even briefly. The application mapping engine 506 may prevent an update of a switch 504 that services the application until a confirmation is received giving permission to perform the update. Alternatively, the application mapping engine 506 may identify a particular time of day in which the application is not in use and may reschedule the update for the particular time of day.

In another embodiment, the application mapping engine generates or recommends a data management policy for a device based on the applications mapped to the device. For example, the application mapping engine 506 may identify a particular application, mapped to the server 501, as having a high priority. Accordingly, the application mapping engine 506 may recommend routing traffic destined for the server 501 through an additional firewall.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
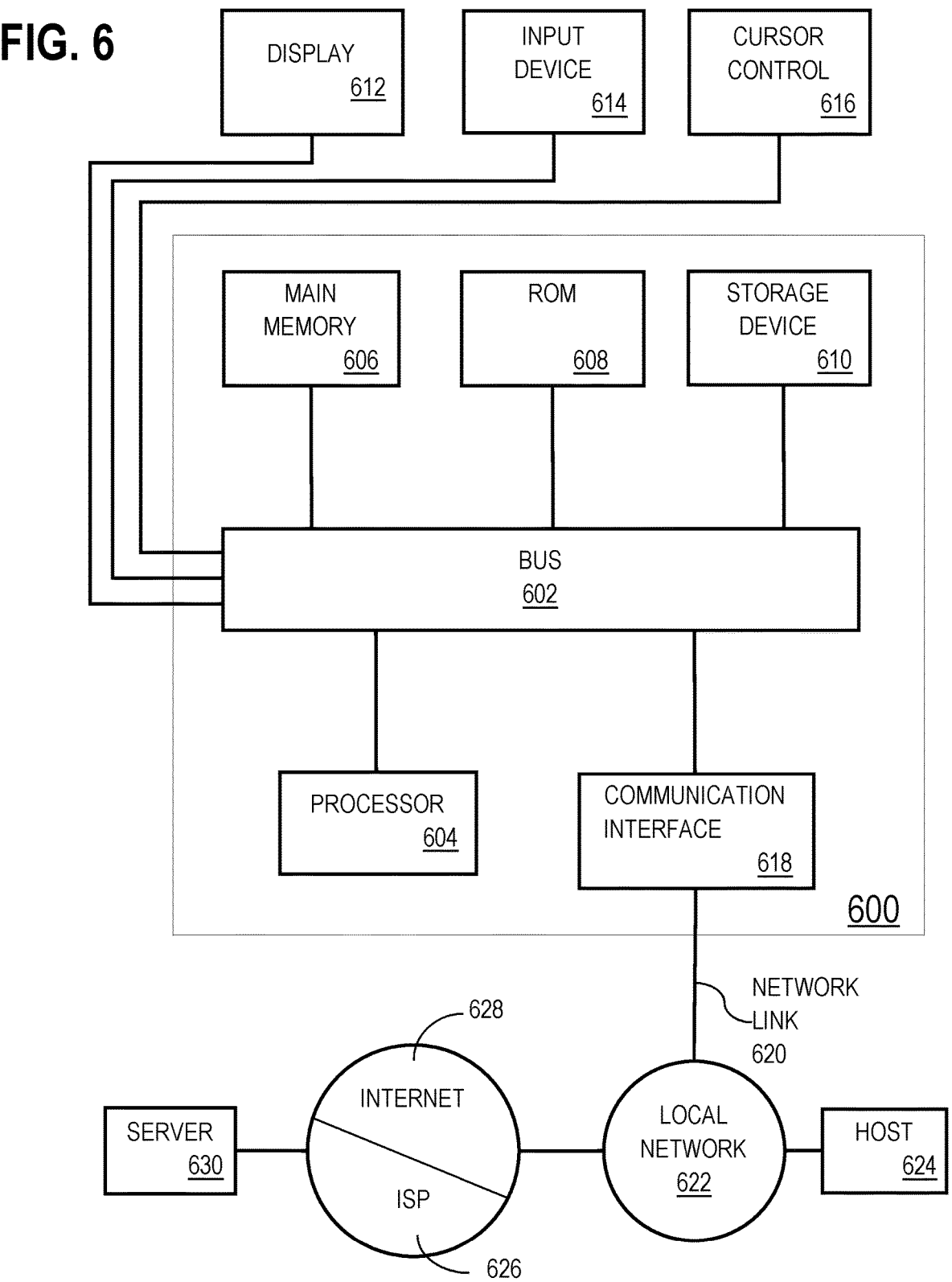
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   monitoring data transmitted on a network to identify a plurality of data traffic patterns in the network;
   based on the plurality of data traffic patterns: identifying a plurality of applications associated with respective subsets of the data, the plurality of applications comprising a first application and a second application;
   determining that a particular network infrastructure element, among a plurality of network infrastructure elements, processes a first subset of data associated with the first application;
   responsive to determining that the particular network infrastructure element processes the first subset of data associated with the first application, storing a mapping between the particular network infrastructure element and the first application;
   determining that the particular network infrastructure element does not process data associated with the second application;
   responsive to determining that the particular network infrastructure element does not process data associated with the second application, refraining from storing a mapping between the particular network infrastructure element and the second application;

receiving a request to perform an operation associated with the network infrastructure element;

responsive to receiving the request, obtaining a mapping of: (a) the network infrastructure element to (b) a set of applications for which the network infrastructure element processes data, the set of applications including the first application; and responsive to determining that the network infrastructure element processes data for the first application based on the mapping of the set of applications:

transmitting a notification, corresponding to the operation associated with the network infrastructure element, to an entity or device associated with the first application.

2. The media of claim 1, wherein identifying the first application based on at least one of the plurality of data traffic patterns comprises assigning an identifier to the first application without determining a type or name of the first application.

3. The media of claim 1, wherein the instructions further cause:

based on the plurality of data traffic patterns, identifying a first device executing the first application, wherein the first device is different than the particular network infrastructure element.

4. The media of claim 3, wherein receiving the request to perform the operation associated with the network infrastructure element includes receiving a request to alter a state of the particular network infrastructure element, wherein the instructions further cause:

based on the plurality of data traffic patterns, identifying an entity associated with the first application, wherein the notification to the entity or device associated with the first application includes a notification corresponding to availability of the particular network infrastructure element.

5. The media of claim 1, wherein determining that the particular network infrastructure element processes data associated with the first application is based on:

monitoring data being processed by the particular network infrastructure element to determine that at least the first subset of the data processed by the particular network infrastructure element is associated with a particular port number;

determining that a first set of data, corresponding to the first application, is associated with the same particular port number.

6. The media of claim 1, wherein the instructions further cause:

based on the mapping between the particular network infrastructure element and the first application:

determining a data management policy for the particular network infrastructure element.

7. The media of claim 1, wherein the instructions further cause:

based on a mapping between a source Internet protocol (IP) address for a data packet received from outside of the network to a private IP address associated with the particular network infrastructure element:

transmitting a notification, associated with the particular network infrastructure element, to the source IP address.

8. A method, comprising:

monitoring data transmitted on a network to identify a plurality of data traffic patterns in the network;

based on the plurality of data traffic patterns: identifying a plurality of applications associated with respective subsets of the data, the plurality of applications comprising a first application and a second application;

determining that a particular network infrastructure element, among a plurality of network infrastructure elements, processes a first subset of data associated with the first application;

responsive to determining that the particular network infrastructure element processes the first subset of data associated with the first application, storing a mapping between the particular network infrastructure element and the first application;

determining that the particular network infrastructure element does not process data associated with the second application;

responsive to determining that the particular network infrastructure element does not process data associated with the second application, refraining from storing a mapping between the particular network infrastructure element and the second application;

receiving a request to perform an operation associated with the network infrastructure element;

responsive to receiving the request, obtaining a mapping of: (a) the network infrastructure element to (b) a set of applications for which the network infrastructure element processes data, the set of applications including the first application; and responsive to determining that the network infrastructure element processes data for the first application based on the mapping of the set of applications:

transmitting a notification, corresponding to the operation associated with the network infrastructure element, to an entity or device associated with the first application.

9. The method of claim 8, wherein identifying the first application based on at least one of the plurality of data traffic patterns comprises assigning an identifier to the first application without determining a type or name of the first application.

10. The method of claim 8, further comprising:

based on the plurality of data traffic patterns, identifying a first device executing the first application, wherein the first device is different than the particular network infrastructure element.

11. The method of claim 10, wherein receiving the request to perform the operation associated with the network infrastructure element includes receiving a request to alter a state of the particular network infrastructure element, wherein the method further comprises:

based on the plurality of data traffic patterns, identifying a client associated with the first application; and wherein transmitting the notification, corresponding to the operation associated with the network infrastructure element, to the entity or device associated with the first application includes transmitting the notification to the client associated with the first application responsive to receiving the request.

12. The method of claim 8, wherein determining that the particular network infrastructure element processes data associated with the first application is based on:

monitoring data being processed by the particular network infrastructure element to determine that at least the first subset of the data processed by the particular network infrastructure element is associated with a particular port number;

determining that a first set of data, corresponding to the first application is associated with the same particular port number.

13. The method of claim 8, further comprising:
based on the mapping between the particular network infrastructure element and the first application:
determining a policy for the particular network infrastructure element.

14. The method of claim 8, further comprising:
based on a mapping between a source Internet protocol (IP) address for a data packet received from outside of the network to a private IP address associated with the particular network infrastructure element:
transmitting a notification, associated with the particular network infrastructure element, to the source IP address.

15. A system, comprising:
one or more processors; and
memory storing instructions that, when executed by the one or more processors, cause the system to perform:
monitoring data transmitted on a network to identify a plurality of data traffic patterns in the network;
based on the plurality of data traffic patterns: identifying a plurality of applications associated with respective subsets of the data, the plurality of applications comprising a first application and a second application;
determining that a particular network infrastructure element, among a plurality of network infrastructure elements, processes a first subset of data associated with the first application;
responsive to determining that the particular network infrastructure element processes the first subset of data associated with the first application, storing a mapping between the particular network infrastructure element and the first application;
determining that the particular network infrastructure element does not process data associated with the second application;
responsive to determining that the particular network infrastructure element does not process data associated with the second application, refraining from storing a mapping between the particular network infrastructure element and the second application;
receiving a request to perform an operation associated with the network infrastructure element;
responsive to receiving the request, obtaining a mapping of: (a) the network infrastructure element to (b) a set of applications for which the network infrastructure element processes data, the set of applications including the first application; and
responsive to determining that the network infrastructure element processes data for the first application based on the mapping of the set of applications:
transmitting a notification, corresponding to the operation associated with the network infrastructure element, to an entity or device associated with the first application.

16. The media system of claim 15, wherein identifying the first application based on at least one of the plurality of data traffic patterns comprises assigning an identifier to the first application without determining a type or name of the first application.

17. The one or more non-transitory machine-readable media of claim 3, wherein monitoring data transmitted on a network is performed by a sensor located along a data transmission path between the network infrastructure element and the first device in the network.

18. The one or more non-transitory machine-readable media of claim 1, wherein the operations further comprise:
identifying a type of the first application as one of:
a data entry application;
a graphics-based application;
an email application;
a voice application; and
a video application; and
assigning a first identifier associated with the first application to the first subset of data based on the type of the first application, without determining a name of the first application.

* * * * *